United States Patent
Sullivan et al.

(10) Patent No.: US 7,333,519 B2
(45) Date of Patent: *Feb. 19, 2008

(54) METHOD OF MANUALLY FINE TUNING AUDIO SYNCHRONIZATION OF A HOME NETWORK

(75) Inventors: Gary E. Sullivan, Trabuco Canyon, CA (US); Dusty D. Rector, Southlake, TX (US)

(73) Assignee: Gateway Inc., Irvine, CA (US)

( * ) Notice: Subject to any disclaimer, the term of this patent is extended or adjusted under 35 U.S.C. 154(b) by 1032 days.

This patent is subject to a terminal disclaimer.

(21) Appl. No.: 10/128,369

(22) Filed: Apr. 23, 2002

(65) Prior Publication Data

US 2003/0198257 A1    Oct. 23, 2003

(51) Int. Cl.
*H04J 3/06* (2006.01)
(52) U.S. Cl. ............. 370/517; 370/252; 715/771; 381/58
(58) Field of Classification Search ............ None
See application file for complete search history.

(56) References Cited

U.S. PATENT DOCUMENTS

| | | | |
|---|---|---|---|
| 3,798,650 A | 3/1974 | McComas et al. | |
| 4,005,266 A | 1/1977 | Lehr et al. | |
| 4,234,958 A | 11/1980 | Pipes et al. | |
| 4,280,150 A * | 7/1981 | Bates | 386/81 |
| 4,543,657 A | 9/1985 | Wilkinson | |
| 4,843,617 A | 6/1989 | Marshall et al. | |
| 5,146,585 A | 9/1992 | Smith, III | |
| 5,388,102 A | 2/1995 | Griffith et al. | |
| 5,402,450 A | 3/1995 | Lennen | |
| 5,416,808 A | 5/1995 | Witsaman et al. | |
| 5,469,467 A | 11/1995 | Vella-Colerio | |
| 5,530,704 A | 6/1996 | Gibbons et al. | |
| 5,594,660 A * | 1/1997 | Sung et al. | 715/500.1 |
| 5,734,985 A | 3/1998 | Ito et al. | |
| 5,815,634 A * | 9/1998 | Daum et al. | 386/96 |
| 6,154,600 A * | 11/2000 | Newman et al. | 386/4 |
| 6,175,604 B1 | 1/2001 | Noro et al. | |
| 6,243,372 B1 | 6/2001 | Petch | |
| 6,526,325 B1 * | 2/2003 | Sussman et al. | 700/94 |
| 6,611,537 B1 * | 8/2003 | Edens et al. | 370/503 |
| 6,798,889 B1 * | 9/2004 | Dicker et al. | 381/303 |
| 2002/0007426 A1 * | 1/2002 | Ando et al. | 710/25 |
| 2002/0089602 A1 * | 7/2002 | Sullivan | 348/500 |

* cited by examiner

*Primary Examiner*—Duc Ho
(74) *Attorney, Agent, or Firm*—Ross F. Hunt, Jr.; Slites & Harbison PLLC (57) ABSTRACT

A method is provided for manually synchronizing the playback of a digital audio broadcast on a plurality of network output devices. The method is applicable for use with methods such as those that use a time code, insert a control track pulse, or use an audio waveform sample for synchronization. The manual adjustment method relies on a graphical user interface for adjustment and audible pulses from the devices which are to be synchronized. The digital audio broadcast from multiple receivers does not present to a listener any audible delay or echo effect.

42 Claims, 10 Drawing Sheets

METHOD OF MANUALLY FINE TUNING AUDIO SYNCHRONIZATION OF A HOME NETWORK

FIELD OF THE INVENTION

This invention generally relates to audio playback for multiple devices, and specifically, to synchronizing the audio playback.

BACKGROUND OF THE INVENTION

In order to achieve a depth and richness of sound, two or more audio devices are used to provide a surround sound effect to the listener. These audio devices may be cabled to a controller device which provides the audio data to them. A bus may be used to supply this data. Alternatively, the different devices may communicate with each other through wireless communication, such as through an RF or infrared port.

In a system in which one computer or device broadcasts a single digital audio stream that is then simultaneously received by more than one receiving device, the different receiving devices will often play their audio slightly out of sync with each other, due to differing latencies in receiving and processing the digital audio stream. This produces an echo or delay effect which causes a listener to receive the same audio at slightly different times from the multiple devices. The listener's enjoyment is thereby impaired.

A method and apparatus for synchronizing the playback of audio from several devices is needed.

SUMMARY OF THE INVENTION

The present invention provides a method and apparatus for manually synchronizing the playback of the audio from several audio receivers so that there is no audible delay or echo effect between them when listened to simultaneously.

In a first aspect of the present invention, a method of manually fine tuning audio synchronization on a home network, includes the steps of outputting audible signals from two or more devices on the home network, displaying graphics which represent a control mechanism for adjusting the time delay between the two audible signals, moving a graphics object of a graphics control mechanism so as to increase or decrease a timing delay in reference to the audible sound, and, once the signals are determined to be simultaneous, recording the delay for the devices and correcting the timing of the audio output with the delay so as to make the two devices sound synchronized.

In a second aspect of the present invention, a method of synchronizing the playback of an audio broadcast on a plurality of network output devices, including the steps of initially synchronizing the audio playback of the plurality of network output devices by an automated process involving an audio stream and then manually synchronizing the audio playback of the plurality of network output devices. The digital audio broadcast from multiple receiving devices do not present to a listener any audible delay or echo effect.

In a third aspect of the invention, a system for synchronizing audio playback of multiple receiving devices which includes a transmitting device and two or more receiving devices. The receiving devices are synchronized through at least two of the group consisting of a control track pulse, a time code, an audio waveform sample, communication latency, and processing latency. One of the devices allows a user to manually synchronize the audio playback of the devices.

In a fourth aspect of the present invention, a system for synchronizing the audio playback of two or more receiving devices is disclosed which includes means for transmitting consecutive unique signals in an audio stream, means for receiving the consecutive unique signals in the audio stream, the time the means for receiving the unique signal takes to act upon the unique signal being determined by a communications latency between the transmitting means and the receiving means and a processing latency determined by internal processing by the receiving means, and means for manually synchronizing the audio playback of the devices.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally now to FIGS. 1 through 13, exemplary embodiments of the present invention are shown.

The present invention describes a method of enabling simultaneous output of audio signals on multiple output devices by including time output information pulse output signal, wave form synching, and a user adjustable control to control the delay of signal between source and output systems. This invention comprises a method of manually fine tuning the synchronization of audio output on multiple networked output devices. The method comprises the output of a synchronized audio signal from two or more devices and allows the user to increase or decrease the timing delay in reference to the audible sound. Once the signals sound simultaneous to the user, the delay is recorded for the devices and added to subsequent audio output to reproduce the delay identified by the user to make the two devices sound synchronized.

The present invention provides methods and apparatuses for synchronizing the audio playback of several devices.

In a first method, a digital audio time code inserter adds a reference time value to a digital audio stream, for the purpose of keeping multiple receivers of an audio stream synchronized with one another. This method may require that the transmitting device be in sync with the receivers. The device sending audio simply adds an absolute time reference value to the digital audio stream, every n seconds or milliseconds. If a computer receiving an audio signal has an accurate time reference common with other device(s), it can keep the signal in sync with the transmitting device by comparing the reference time in the audio stream with its own time clock. This is similar in concept and purpose to the Society of Motion Picture and Television Engineers (SMPTE) time codes added to audio and video signals in professional recording applications. This method may require that the computer be used as a source of the audio stream have a clock that has been synchronized with all receiving devices. It is assumed that the receiver can strip the time code from the digital audio stream before further processing. The transmitting device first sets its own clock, then sets the clocks on all receiving devices. Each receiver periodically adjusts itself for time drift. The transmitting device inserts a time code into the audio stream using the Digital Audio Time Code Inserter. The transmitting device may "pad" the time relative to its actual broadcast, i.e., add an offset time value (and if it is also playing audio, synchronize its playback with this padded time value). It may do this to allow each receiver the ability to buffer some audio before beginning playback, and to be able to adjust its playback either forward or backward in time to affect synchronization. Each device keeps the playback of the audio in sync with other devices by synchronizing the audio stream playback with its own (synchronized) clock.

Figure 8:
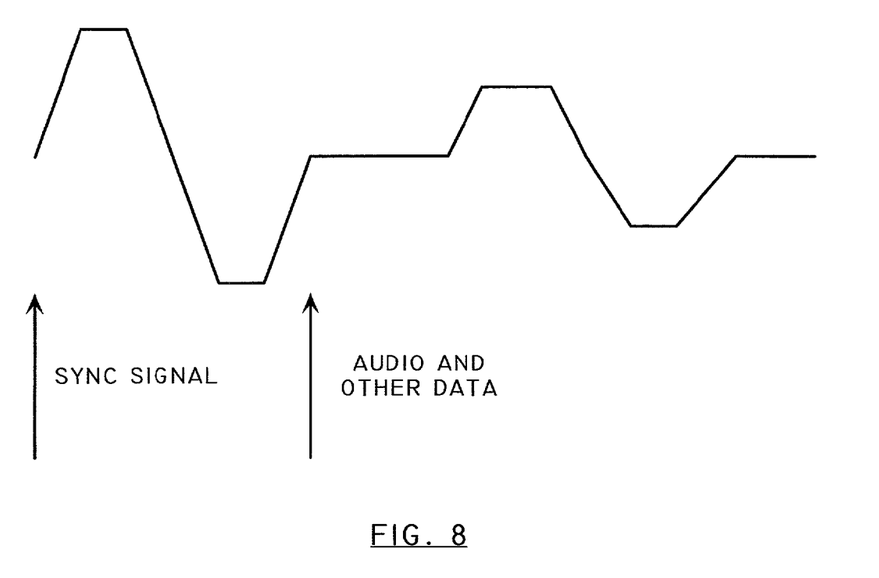
FIG. 8 illustrates a flow chart for finding a sync signal in an audio stream.

In a second method, a control track pulse is inserted into the audio stream. This method may require that only the receivers stay in sync. The audio transmitting device inserts a control track pulse or marker into the digital audio stream at regular known intervals, i.e., exactly one per 2 seconds of audio, beginning at 0:00. This is similar to control pulses added to video tape signals to support time tracking on consumer video equipment. Like the time code value, it can be used to synchronize playback between two or more audio receivers, but unlike the time code, it is not required that the transmitter have a clock that is synchronized with the receivers (for instance, it could be in a remote location). A "pulse" could be something as simple as inserting a single audio sample of maximum amplitude, while reducing any such naturally occurring value by one, so that the pulse value is unique in the digital stream. An example of a control track pulse is shown in FIG. 8. The audio transmitting device inserts a reference pulse into the audio stream using the control track pulse generator. The time between two pulses (pulse interval) must be significantly greater than the latency between any device and the transmitter (at least two times greater; preferably three, four, or more times greater). The method may employ a process which is a code module which has at least one thread and one unfragmented space of unfragmented virtual memory so that each process is protected from other processes. The method may also be implemented through hardware.

In a third method, one device can determine whether a specific section of the digital audio stream is being played either behind or ahead of the same section being played on another device, the reference device. This method may require that only the receivers stay in sync. This method may require that the reference device transfer to the second device a brief portion of a digital waveform it is playing (a series of digital audio samples), along with the exact time at which this waveform is expected to play. The second device locates the same waveform sample in its stream, and can then use it as a reference to adjust its own playback of the audio stream to be in sync with the reference. The waveform is only a small part of the audio stream—it might be a small set of sequential audio samples, or a set of every nth audio sample, to be determined by empirical test. The transmitting device might or might not be playing audio, and could be remote from the receiving devices. If the transmitting device is local and playing audio, it would participate in the same synchronized audio playback method as described below. This method requires nothing of the audio transmitting device, neither time synchronization, nor modification of the digital audio stream. A single time reference device PCA (one of the receivers) first sets its own clock, then sets the clocks on all the other receiving devices, as described above. PCA also keeps a record of the latency value for each receiver. Each receiver periodically adjusts itself for time drift. PCA determines an arbitrary reference interval/audio delay value (i.e., 2 seconds). PCA may keep its own playback of the audio stream delayed by this value. At exactly each reference interval (i.e., every 2 seconds) in the incoming stream, PCA captures a brief signature digital "waveform" of the audio (a series of audio sample values, enough to identify a unique segment of audio).

All devices may buffer the audio stream. Some amount of buffering of the audio stream is occurring, to allow the receiving devices to search forward and backward in the audio data, and to allow them to delay or shift audio playback. Signal transmission may be in analog or digital format.

The transmitting device might or might not be playing audio and does not have to be in sync with the receivers. However, if the transmitting device is local and playing audio, it would participate in the same synchronized audio playback method.

Figure 1:
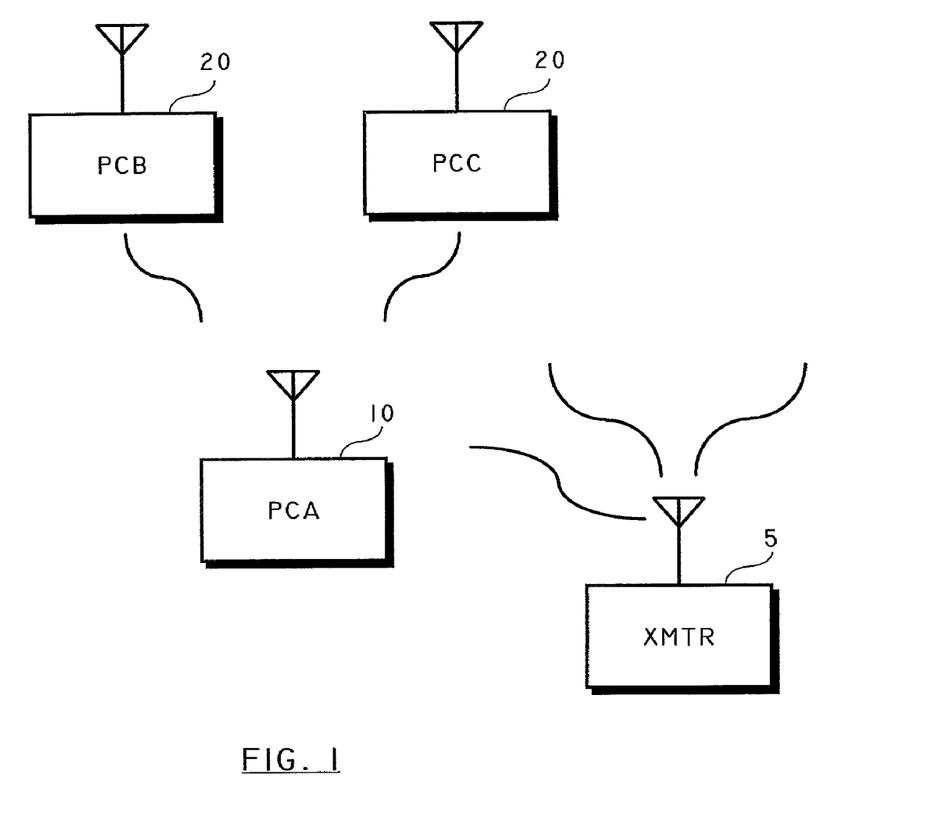
FIG. 1 illustrates a system having a plurality of devices.

FIG. 1 illustrates a system of several devices. Transmitting device PCA sends the audio stream, sync information, and time and other data to receiving devices PCn, such as PCB and PCC. Transmitting device PCA controls audio playback for the system. The audio signal actually is transmitted by audio source 5 to PCA and other devices PCn, such as PCB. The devices may be interconnected by a bus cabling or may communicate with one another through wireless communication such as radio frequency or infrared.

Several discrete sub-processes are used in the present invention. These include a latency detector, a clock synchronizer, a time drift detector, and manual fine tune control. Each networked device supplies a real-time system clock that can be set, that measures time in increments since some beginning absolute point in time, and that measures time in sufficiently small increments to be used as a synchronization reference for digital audio.

An average latency detector detects the average latency between transmitting a signal to a device, and the device receiving the signal. "Symmetrical latency" is assumed between two computers, e.g., if a signal packet is sent from PCA to PCB, and an acknowledgment packet is returned from PCB to PCA, the time from PCA to PCB will be, on average, approximately the same as from PCB to PCA.

All devices may account for latency of their own audio playback subsystem. Playback devices may also account for normal latency in the audio subsystem. There are three different methods for this, each of which would occur after the other processes described herein have been used to synchronize the clocks on all audio playback devices: 1) shifting the playback by a predetermined value, such value determined through empirical testing of the actual playback device; 2) shifting the playback by a predetermined value, such value determined at run time, by the customer, using the manual audio synchronization fine-tune control, to determine the actual latency of the device's internal audio subsystem; and 3) fine-tuning the clock synchronization at run time, by the customer, using the manual audio synchronization fine-tune control.

In an embodiment of the method, several steps are used to determine the latency. First, a variable "latency" is set to 0. Second, PCA fetches its current time and records from "Start Time". Third, PCA sends a signal packet to PCB. Fourth, PCB receives the message and immediately sends an acknowledgment to PCA. Fifth, upon receiving the acknowledgment from PCB, PCA again fetches its local time and records one-half of the difference between Start Time and the current time. Sixth, PCA averages this new latency value with all previous latency values and records it as "latency". After n repeated cycles, it discards any "outliers", values that are not close to the current average. The second through sixth steps are repeated as many times as necessary to get an accurate time reference.

Figure 2:
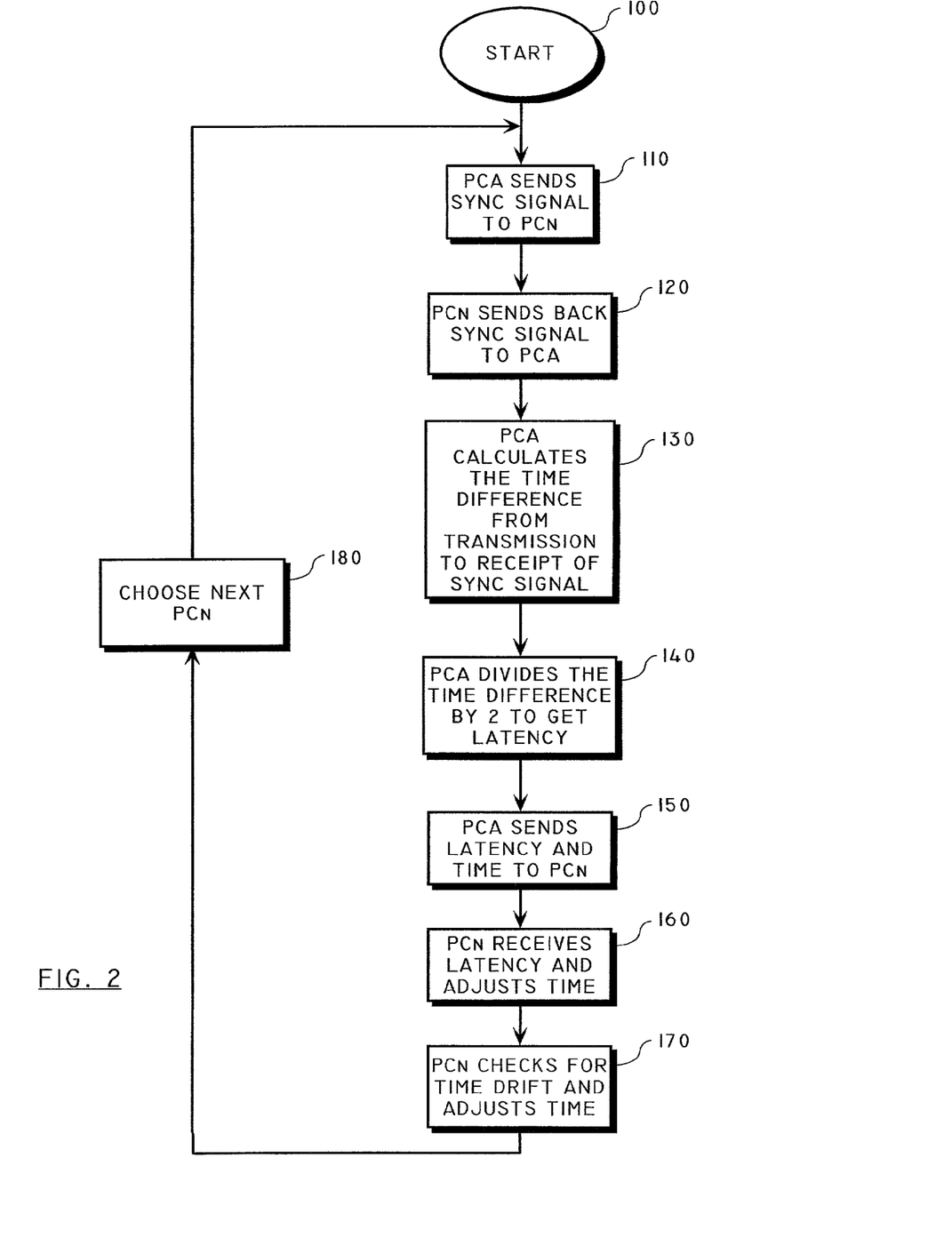
FIG. 2 illustrates a flow chart for setting the time in a receiver device.

FIG. 2 illustrates a flow chart of the steps. At the start, step 100, the latency value is set to zero. The controlling device, PCA, sends the audio waveform sample to receiving device PCn, step 110. PCn sends back the audio waveform sample to PCA, step 120. PCA calculates the time difference from the transmission of the audio waveform sample to its receipt back from the receiving device PCn, step 130. PCA divides the time difference by two to derive the latency, step 140. PCA sends the latency and time to PCn, step 150. PCn receives the latency and adjusts the time, step 160. PCn checks for time drift and adjusts its time, step 170. The next receiving device, PCn, is sent data, step 180.

Figure 4:
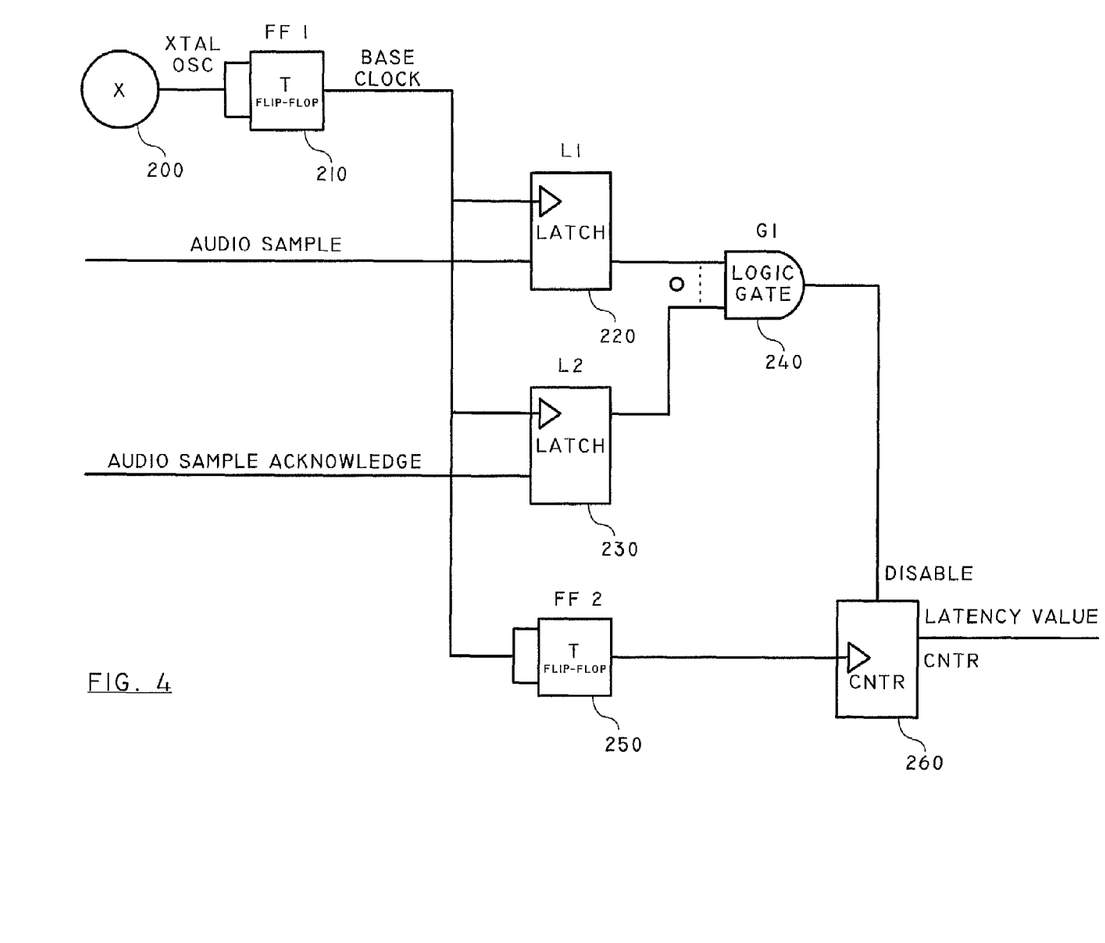
FIG. 4 illustrates an exemplary circuit for deriving the latency value from the sync signal.

FIG. 4 illustrates an example of a hardware implementation to derive a latency value on the assumption of symmetrical latency. An oscillator 200, e.g., a crystal oscillator, is biased to provide a high frequency regular pulsing signal. This is input to a T flip-flop 210 which generates a regular, well squared base clock. The base clock drives the timing of the entire device, including latches 220 and 230 and T flip-flop 250. Latch 220 stores the sync signal. These sync signals may be used to generate pulses by pulse width adjustable monostable multivibrators or other means. Latch 230 stores the sync signal returned from receiving device PCn. Logic 240 allows the counter 260 to count from the time the sync signal is sent until the audio waveform sample is returned to PCA from PCn. All the time the T flip-flop is providing a clock signal equal to one-half the clock rate of the base clock, effectively performing a divide-by-two operation to derive the latency value.

If the assumption of symmetrical latency (above) is not true, and if the asymmetry between latency values due to differing performance characteristics between two types of computers can be quantified, this value might be either more or less than one-half.

In the case of asymmetrical latency, various techniques may be employed to determine the latency time between the transmitting device and the receiving device.

Figure 5:
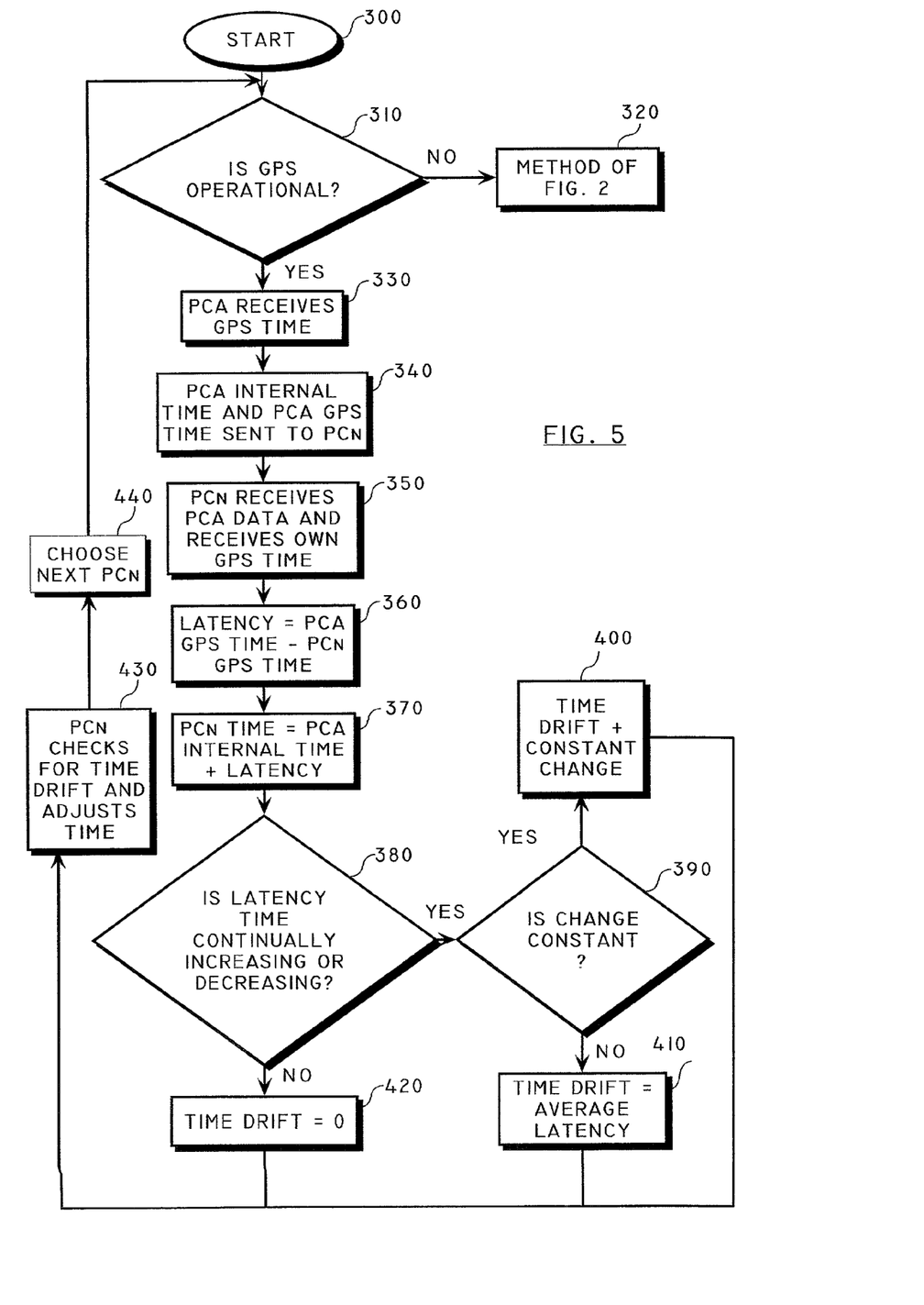
FIG. 5 illustrates an embodiment which uses GPS as the primary system for timing the audio.

In one embodiment, as shown in FIG. 5, the audio waveform sample transmitting device and receiving devices have global positioning system (GPS) receivers which allow time management at the microsecond level. The audio waveform sample transmitting device initializes, step 300, and determines if the GPS time is accessible, step 310. If the GPS time is not accessible, the method of FIG. 2 is used. Otherwise, PCA receives the GPS time, step 330. PCA sends its internal time and GPS time to PCn, step 340. PCn receives this data and accesses its own GPS time, step 350. The latency for PCn is determined by subtracting the GPS time of PCA from the GPS time of PCn, step 360. The PCn time is determined by adding the latency to PCA time, step 370. PCn determines whether the latency is continually increasing or decreasing, step 380. This is done by storing successive samples of latency in chronological order and comparing the different values for trends in magnitude over time. Look up tables may be used for this process. If the change is continually increasing or decreasing, a determination is made as to whether the change is constant, step 390. If it is constant, the time drift is set to the constant change over sample time, step 400. Otherwise, the time drift is set to the average latency, step 410. If the latency time is not continually increasing or decreasing, the time drift is set to zero, step 420. PCn adjusts its time according to the time drift, step 430. The next PCn is selected to receive data, step 440.

A clock synchronizer is a process that one networked computer can use to synchronize another networked computer's clock to its own. By extension, it can then synchronize all of the clocks on n computers by connecting to other computers and repeating the process.

Figure 6:
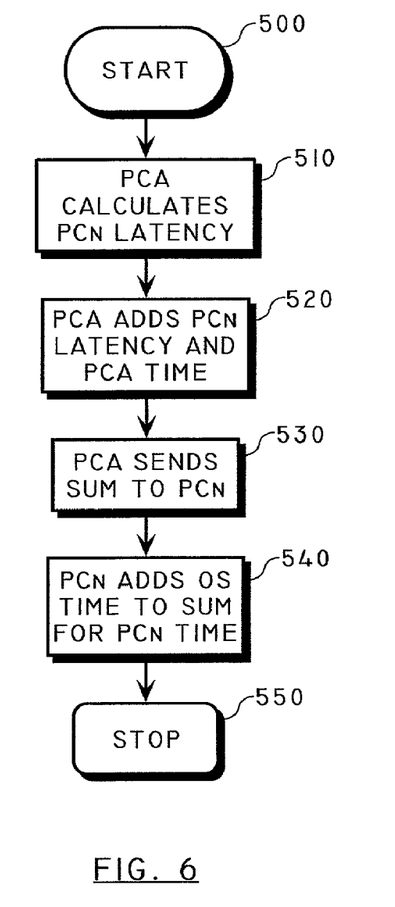
FIG. 6 illustrates a transmitting device's method for calculating PCA and latency time.

In an exemplary embodiment, as shown in FIG. 6, the method includes the following steps. First, the clock synchronizer utilizes the latency detector (above) to determine the average amount of time it takes for a signal to travel from the reference computer or device (PCA) to another device (PCB). Second, PCA fetches its own time, adds the latency value to it and sends it to PCB. Third, PCB takes this time value and adds a known value representing the time it takes for the operating system (OS) to respond to a "time set" command, and sets its own time accordingly.

Figure 7:
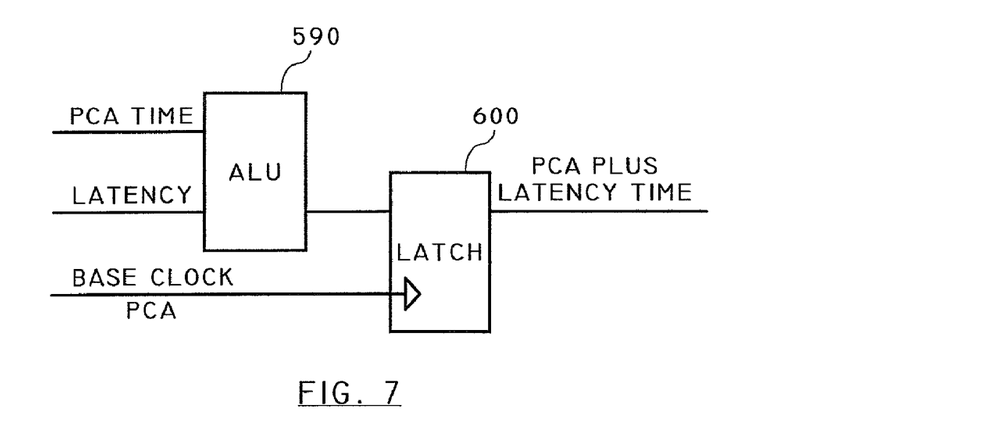
FIG. 7 illustrates an exemplary circuit for deriving a receiving device's time.
Figure 9:
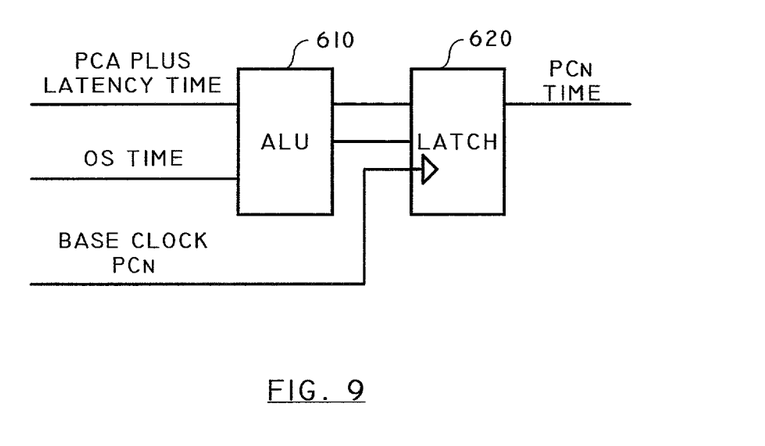
FIG. 9 illustrates a receiving device's method for calculating PCn time.
Figure 10:
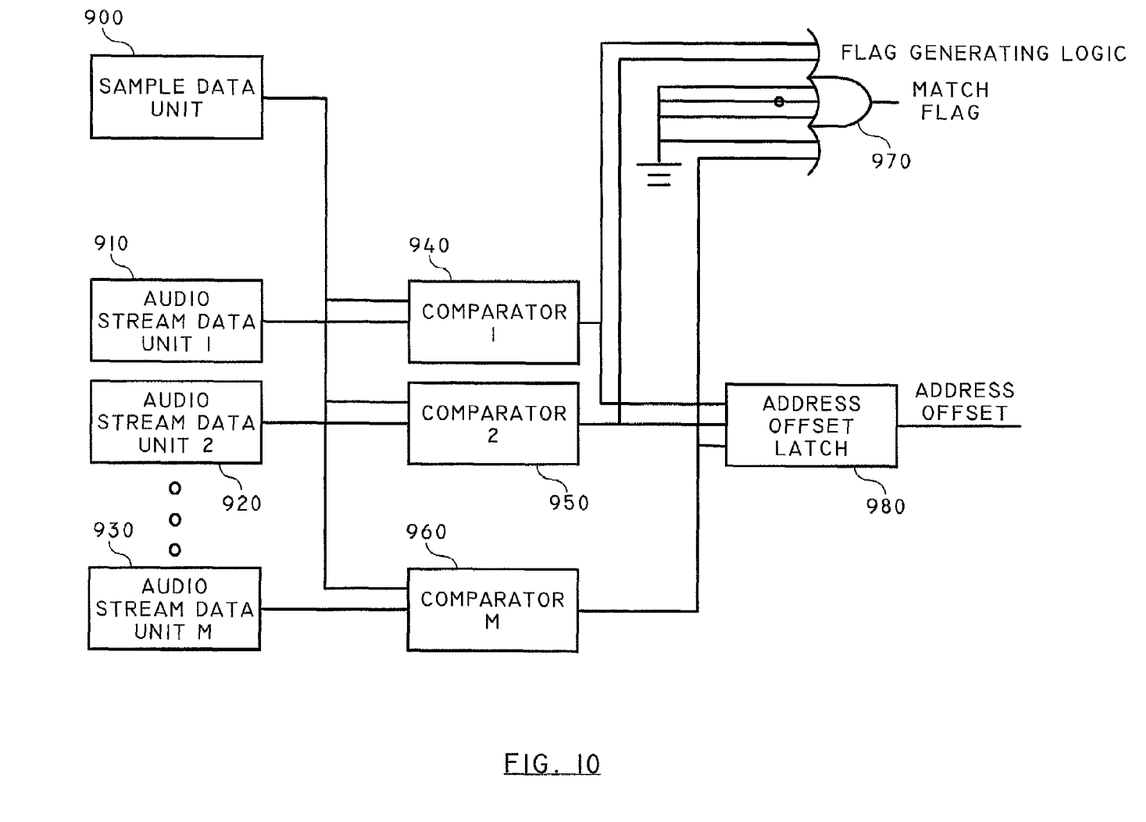
FIG. 10 illustrates a block diagram showing an exemplary hardware implementation for identifying the sync signal in the audio stream.

An exemplary hardware implementation of the circuitry is shown in FIGS. 7 and 9. FIG. 7 refers to circuitry on PCA; FIG. 9 refers to circuitry on PCn. The circuitry of FIGS. 7 and 9 may be combined on either PCA or PCn. ALU 590 adds the latency to PCA time to derive the time to be sent to PCn. The base clock which serves for internal timing of PCA clocks latch 600. This latch stores the PCA with added latency time. FIG. 9 shows a like circuit on receiving device PCn. The ALU 610 causes the addition to or subtraction from the time drift with respect to the PCA with added latency time. The latch 620 stores the value for the PCn time.

A time drift detector is a simple process by which a device that is periodically receiving a time standard from the clock synchronizer checks for the amount that its own clock is drifting from the time standard, and compensates for it by periodically adding or subtracting from its own clock. It assumes that a device's system clock might drift, fast or slow, relative to the master device's clock, and that the rate of drift is constant. The time drift detector may be implemented in hardware, software, or a combination of hardware and software.

Figure 3:
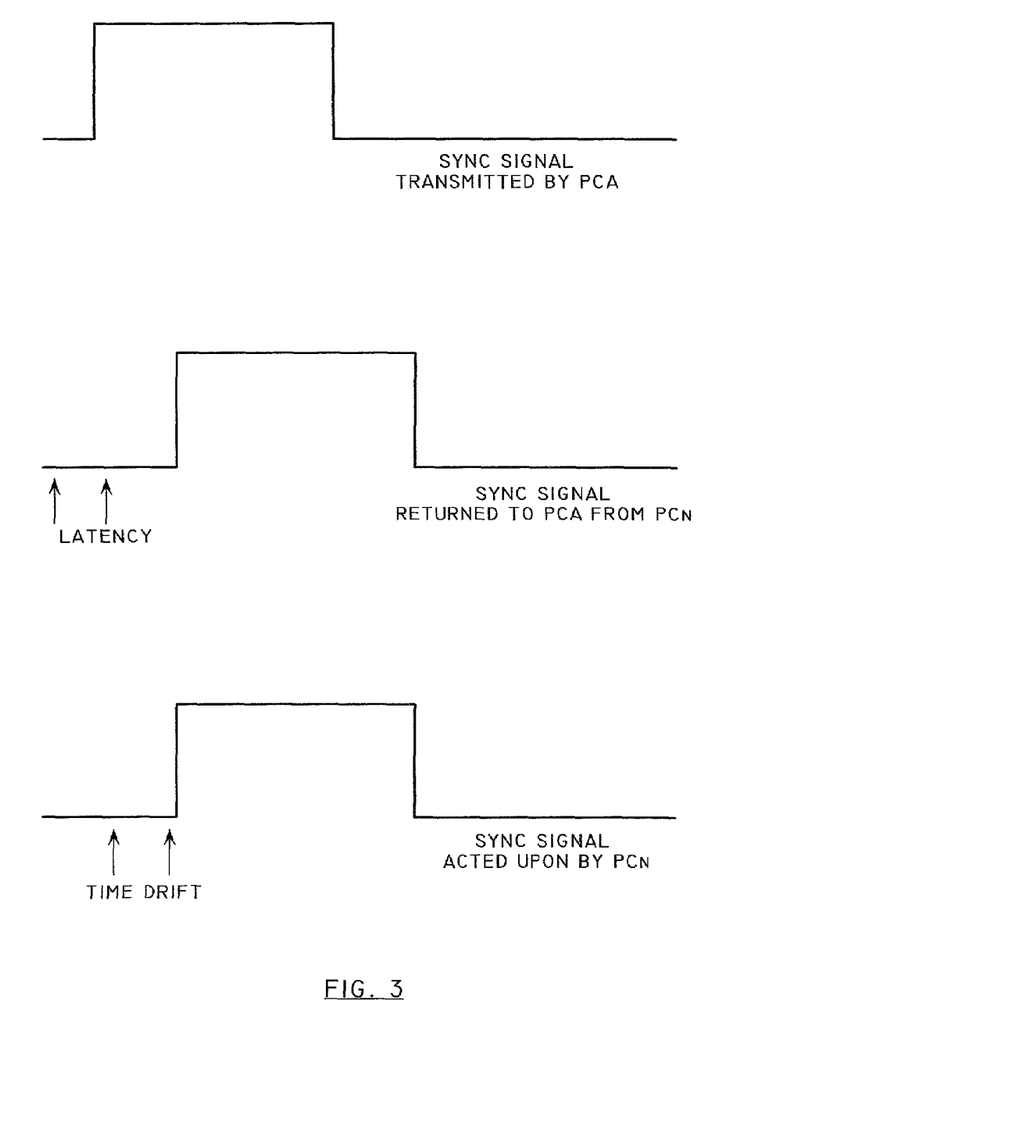
FIG. 3 illustrates the delay on the sync signal through latency and a potential effect of time drift.

FIG. 3 illustrates time displacements of the sync signal. Approximately one half the time the sync signal from PCA to PCn is the latency. A delay occurs from the receipt of data by PCn until the data is acted upon by PCn. This is the time drift.

A manual audio synchronization fine-tune control allows the user to "fine tune" the end results of automated synchronization. It also allows the user to manually determine the internal latency of a device audio playback subsystem, by comparing the amount and direction of playback latency error between itself and a reference system with a known internal audio subsystem latency value. The system requires at least two devices playing audio, one that is the reference (PCA), and one that is adjusted by the user (PCB). In one embodiment, the method assumes that the reference player PCA always buffers and delays its own audio playback, so that PCB is able to move its own playback either forward or backward in time, relative to PCA. PCA synchronizes its clock with PCB. PCA emits an audible high-pitched pulse every n seconds, on even n second boundaries. PCB emits an audible pulse every n seconds, on even n second boundaries. PCB displays a graphic slider control to the user, defaulted to "centered" position. As the user slides the control left or right, PCB increments/decrements a correction value, and simultaneously shifts the audio click forward or backward in time. The user adjusts the slider until the two clicks converge and sound to the user as a single click. The resultant correction value may be added or subtracted from PCA's known internal latency value, to determine PCB's internal latency value.

Figure 11:
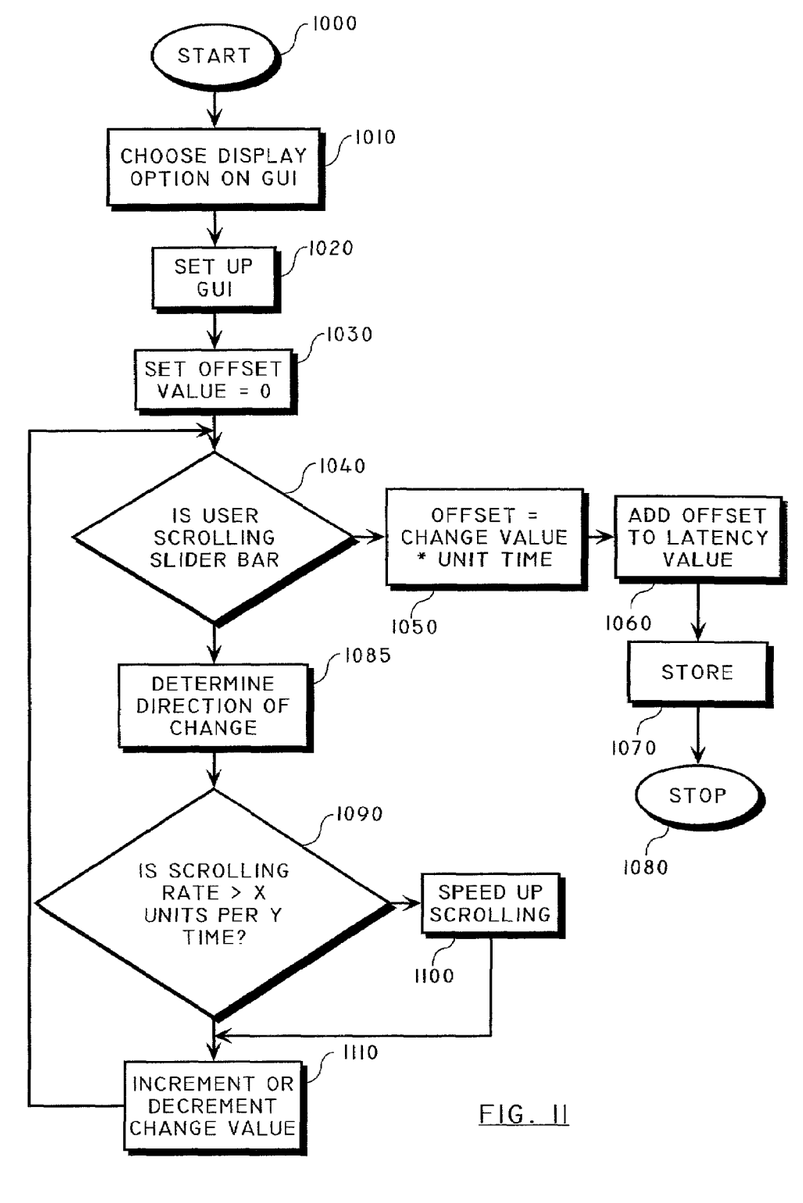
FIG. 11 illustrates a flow chart for an exemplary embodiment of the process for manually synchronizing the audio playback of two or more devices.

FIG. 11 illustrates a flow chart for an exemplary embodiment of the process for manually synchronizing the audio playback of two or more devices. Initially, a graphical user interface (GUI) may be set up to display several display options, including the identification of all or part of a set of audio playback devices, steps 1000, 1010, 1020. An offset value for the latency value is zeroed, step 1030. The processor checks to see if a user is moving the slider bar, step 1040. If the user is not moving the scroll bar, the offset is calculated by multiplying the change value by the unit time (for instance, the base clock period), step 1050. This value is added or subtracted from the latency value, step 1060, and stored, steps 1070 and 1080. If the user is scrolling, then the direction of change is determined, step 1085. If the scrolling has been consistent and of a sufficient length of time, scrolling speed is increased, step 1100. The change value is increased or decreased as a result of the scrolling direction and speed, step 1105.

Figure 12:
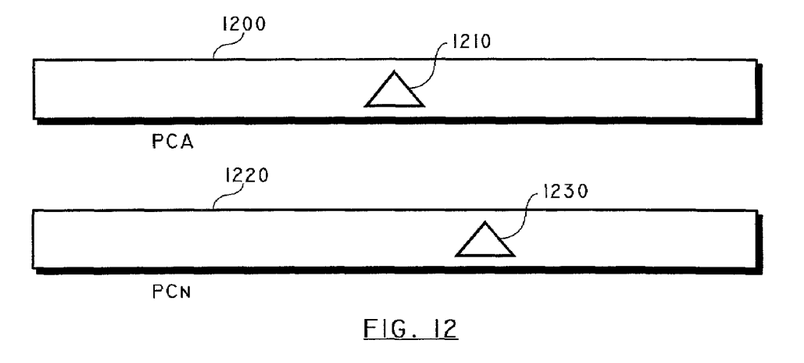
FIG. 12 illustrates horizontal sliding bars for a graphical user interface for manual synchronization.

FIG. 12 illustrates horizontal sliding bars for a graphical user interface for manual synchronization. Two slider bars 1200 and 1220 are placed one above another. The sliding bar for subordinate device PCn has a movable marker 1230 to allow the user to manually set the latency value offset for that device. The marker for the sliding bar 1200 for control device PCA may or may not be movable.

Figure 13:
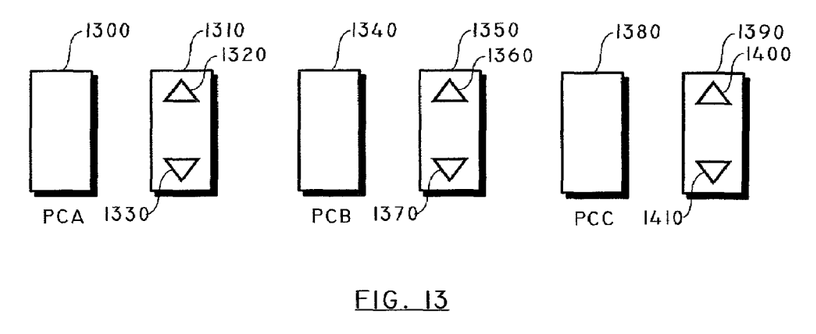
FIG. 13 illustrates vertical bars for a graphical user interface for manual synchronization.

FIG. 13 illustrates vertical bars for a graphical user interface for manual synchronization. Two or more subordinate devices, PCB and PCC, may be represented on a GUI. The number and names of the devices displayed may be chosen by the user. It may be preferable to select a small number of subordinate devices since it may be easier to determine which, if any, of those devices need to be adjusted. Here, control device PCA is shown as a vertical bar 1300 with a separate scroll bar 1310 having up and down arrows 1320 and 1330. Likewise, subordinate device PCB is shown as a vertical bar 1340 with a separate scroll bar 1350 having up and down arrows 1360 and 1370 and subordinate device is shown as a vertical bar 1380 with a separate scroll bar 1390 having up and down arrows 1400 and 1410. The vertical bars 1300, 1340, and 1380 may grow, shrink, or remain the same size during manual adjustment. A screen may appear to allow the user to select which devices should appear on the GUI.

Data entry on the GUI may be accomplished by manual entry on a keyboard or through a touch screen or by a hand held device such as a mouse or track ball or other means.

The above process described three separate roles for devices. However, a single device could take on any of the three roles described, i.e., it could be a receiver and the time reference, or the time reference and the audio transmitter, etc. The process is a single time reference device (probably one of the receivers) first sets its own clock, then sets the clocks on all other receiving devices. Each receiver periodically adjusts itself for time drift. Keeping time synchronized on all receivers is its only responsibility. Each receiving device keeps the playback of the audio in sync with other devices by obtaining the exact time of the received pulse relative to its own (synchronized) clock, and then delaying the audio until the pulse exactly aligns with the next multiple of the pulse interval. For instance, if the pulse interval is once every 5 seconds, but the pulse appears 570 milliseconds prior to 2:15, the audio playback is delayed for 570 milliseconds. Note that the effect of this is that the playback on all devices is in sync, but always behind the transmission by approximately the pulse interval.

PCA transmits to PCB 1) the waveform segment, 2) the exact (delayed) time it is to be played, and 3) PCB's actual latency value. PCB examines its own audio stream, beginning at the current location playing minus the latency value, in other words, it is looking for the spot in the audio that was playing when PCA captured and transmitted the audio segment. PCB searches forward and backward from that spot until it locates the audio segment. PCB synchronizes its audio playback with PCA by delaying the playback until the audio segment is exactly aligned with the exact playback time received from PCA.

It is believed that the method of manually fine tuning audio synchronization of a home network of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method of synchronizing the playback of an audio broadcast on a plurality of network output devices, comprising:
   initially synchronizing the audio playback of the plurality of network output devices by an automated process involving an audio stream; and
   then manually synchronizing the audio playback of the plurality of network output devices such that the digital audio broadcast from multiple receiving devices does not present to a listener any audible delay or echo effect,
   said automated process including inserting, into the audio stream, at least one of a reference time value transmitted by a transmitting device, and a control track pulse transmitted by a transmitting device.

2. The method of claim 1, wherein the automated process includes inserting a reference time value into the audio stream using a transmitting device.

3. The method of claim 2, wherein, in the automated process, the transmitting device sets its own clock and then sets the clocks on all the receiving devices.

4. The method of claim 3, wherein the receiving devices periodically adjust themselves for time drift.

5. The method of claim 4, wherein the transmitting device inserts a time code into the audio stream.

6. The method of claim 1, wherein the automated process includes inserting a control track pulse into the audio stream using a transmitting device.

7. The method of claim 6, wherein the transmitting device need not have its clock synchronized with the receivers.

8. The method of claim 7, wherein one of the receiving devices sets its own clock and then sets the clocks of all the other receiving devices.

9. The method of claim 8, wherein the one of the receiving devices inserts a control track pulse in its audio stream.

10. The method of claim 1, wherein the automated process involves using an audio waveform sample to synchronize audio playback.

11. The method of claim 10, wherein one of the receiving devices sets its own clock and then sets the clocks of the other receiving devices.

12. The method of claim 11, wherein the one of the receiving devices records latency values for the other receiving devices.

13. The method of claim 12, wherein the one of the receiving devices determines an arbitrary reference value.

14. The method of claim 1, wherein latency is derived using first and second consecutive unique signals.

15. The method of claim 14, wherein a transmitting device sends out the first and second unique signals and is clocked at a base clock rate.

16. The method of claim 15, wherein the latency is derived by enabling a counter from the time one of the first and second unique signals is sent until the time of its return to the transmitting device, the counter being clocked at one half the base clock rate.

17. The method of claim 16, further comprising determining the time drift of a receiving device.

18. The method of claim 17, wherein the time drift includes the time for the operating system to respond to a command instruction after the unique signals have been received by the receiving device.

19. The method of claim 1, wherein the audio stream is buffered by the receiving devices.

20. The method of claim 1, wherein global positioning system data is used by at least one of the multiple receiving devices.

21. The method of claim 1, wherein the step of manually synchronizing involves using a graphical user interface.

22. The method of claim 21, wherein the graphical user interface includes sliding bars or scroll bars.

23. The method of claim 22, wherein a user chooses the display option on the graphical user interface.

24. The method of claim 23, wherein the offset value is determined in response to scrolling of the scroll bars or sliding of the sliding bars by the user.

25. The method of claim 24, wherein the speed of the scrolling or sliding is changeable.

26. The method of claim 25, wherein the offset value is added to or subtracted from a latency value for one of the receiving devices and stored.

27. The method of claim 1, wherein the step of manually synchronizing involves audible pulses emanating from each of the devices to be adjusted and a reference device.

28. A system for synchronizing audio playback of multiple receiving devices, comprising:
    a transmitting device;
    two or more receiving devices; and
    means for synchronizing the receiving devices through at least two of the group consisting of a control track pulse, a time code, and an audio waveform sample,
    wherein one of the devices allows a user to manually synchronize the audio playback of the devices.

29. The system of claim 28, wherein the system has a time drift detector.

30. The system of claim 28, wherein the system has a clock synchronizer.

31. The system of claim 28, wherein the system has a latency detector.

32. The system of claim 28, wherein the system has manual fine tune control.

33. The system of claim 28, wherein the system includes a time drift detector, a clock synchronizer, a latency detector, and manual fine tune control.

34. The system of claim 28, wherein the receiving devices are synchronized through audio waveform samples and a communication latency between the transmitting means and the receiving devices is shorter than the time interval between consecutive audio waveform samples.

35. A system for synchronizing the audio playback of two or more receiving devices, comprising:
    transmitting means for transmitting consecutive unique signals in an audio stream;
    receiving means for receiving the consecutive unique signals in the audio stream, the receiving means including an internal processor for determining a communications latency between the transmitting means and the receiving means and a processing latency, the time that the receiving means takes to act upon the unique signals being determined by the communications latency between the transmitting means and the receiving means and the processing latency resulting from internal processing by the internal processor of the receiving means; and
    means for manually synchronizing audio playback.

36. The system of claim 35, further comprising means for synchronizing clocks located in the receiving means.

37. The system of claim 36, further comprising means for detecting time drift in the receiving means.

38. The system of claim 37, further comprising means for manual fine tune control of the receiving means.

39. The system of claim 38, further comprising means for comparing an audio waveform sample with an audio stream.

40. A system for synchronizing audio playback of multiple receiving devices, comprising:
    a transmitting device;
    two or more receiving devices; and
    means for synchronizing the receiving devices through communication latency and processing latency, said synchronizing means synchronizing the receiving devices by determining and correcting for communication latency and processing latency; and
    wherein one of the devices allows a user to manually synchronize the audio playback of the devices.

41. A system for synchronizing audio playback of multiple receiving devices, comprising:
a transmitting device;
two or more receiving devices; and
means for synchronizing the receiving devices through at least two of the group consisting of a control track pulse, a time code, and an audio waveform sample,
wherein one of the devices allows a user to manually synchronize the audio playback of the devices, and wherein said system further includes a time drift detector.

42. A system for synchronizing the audio playback of two or more receiving devices, comprising:
transmitting means for transmitting consecutive unique signals in an audio stream;
receiving means for receiving the consecutive unique signals in the audio stream, the receiving means including an internal processor for determining a communications latency between the transmitting means and the receiving means, and the time that the receiving means takes to act upon the unique signals being determined by the communications latency between the transmitting means and the receiving means and a processing latency resulting from internal processing by the internal processor of the receiving means;
means for manually synchronizing audio playback; and
means for synchronizing clocks located in the receiving means.

* * * * *